US008445608B2

United States Patent
Carpentier et al.

(10) Patent No.: US 8,445,608 B2
(45) Date of Patent: May 21, 2013

(54) PREPARATION OF LONG-CHAIN BRANCHED ISOTACTIC POLYPROPYLENE

(75) Inventors: Jean-Franøois Carpentier, Acigné (FR); Evgueni Kirillov, Rennes (FR); Nicolas Marquet, Quimperlé (FR); Abbas Razavi, Mons (BE)

(73) Assignees: Total Petrochemicals Research Feluy, Seneffe (Feluy) (BE); Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 13/133,695

(22) PCT Filed: Dec. 14, 2009

(86) PCT No.: PCT/EP2009/067062
§ 371 (c)(1),
(2), (4) Date: Aug. 30, 2011

(87) PCT Pub. No.: WO2010/066906
PCT Pub. Date: Jun. 17, 2010

(65) Prior Publication Data
US 2011/0306739 A1  Dec. 15, 2011

(30) Foreign Application Priority Data

Dec. 12, 2008 (EP) .................................... 08291192

(51) Int. Cl.
 C08F 4/653 (2006.01)
 C08F 4/655 (2006.01)
 C08F 4/6592 (2006.01)
 C08F 110/06 (2006.01)

(52) U.S. Cl.
 USPC ........... 526/113; 526/114; 526/160; 526/161; 526/165; 526/351; 526/943

(58) Field of Classification Search
 USPC ................. 526/113, 114, 160, 161, 165, 351, 526/943
 See application file for complete search history.

(56) References Cited

U.S. PATENT DOCUMENTS

| 5,616,664 | A | 4/1997 | Timmers et al. |
| 5,753,785 | A | 5/1998 | Reddy et al. |
| 7,514,510 | B2 * | 4/2009 | Marin et al. ................. 526/170 |
| 2006/0149008 | A1 * | 7/2006 | Razavi ........................... 526/160 |
| 2009/0163688 | A1 | 6/2009 | Marin et al. |
| 2010/0190941 | A1 | 7/2010 | Funaya et al. |

FOREIGN PATENT DOCUMENTS

CA   2032771 A1   6/1991

OTHER PUBLICATIONS

Ye, Zhibin, et al.; "Synthesis of Branched Polypropylene With Isotactic Backbone and Atactic Side Chains by Binary Iron and Zirconium Single-site Catalsysts"; Journal of Polymer Science, Part A: Coden: JPACED; ISSN: 0887-624X, 2003, XP008106433.

Rulhoff, S., et al.; "Direct Copolymerization of Propene and Ethene-Based Macromers to Produce Long Chain Branched Syndiotactic Polypropylene"; Macromolecular Symposia, 236 (Olefin Polymerization), 161-167, Coden: MSYMEC; ISSN: 1022-1360, 2006, XP008106412.

Mise, Takaya, et al.; "Mechanism of Oligomerization of Propylene by (C5Me5)2MC12/methyle aluminoxane catalysts (M=Zr, Hf)"; Chemistry Letters, (9), 1525-8; Coden: CMLTAG; ISSN: 0366-7022, 1991, XP008106467.

Janiak, Christoph, et al.; "Analyses of Propene and 1-hexene Olgomers From Zirconocene/Mao Catalysts—Mechanistic Implications by NMR, SEC, and MALDI-TOF MS"; Macromolecular Chemistry and Physics, 203(1), 129-138; Coden: MCHPES; ISSN: 1022-1352, 2002, XP001125330.

* cited by examiner

Primary Examiner — Caixia Lu

(57) ABSTRACT

The present invention discloses a method for preparing long-chain-branched isotactic polypropylene by first oligomerizing propylene with a suitable oligomerization catalyst system and then copolymerizing propylene and the oligomer obtained in situ with a mono-aryl-substituted methylene bridged catalyst system.

9 Claims, No Drawings

PREPARATION OF LONG-CHAIN BRANCHED ISOTACTIC POLYPROPYLENE

CROSS-REFERENCE TO RELATED APPLICATIONS

This application claims the benefit of PCT/EP2009/067062, filed Dec. 14, 2009, which claims priority from EP 08291192.6, filed Dec. 12, 2008.

The present invention relates to the field of long-chain branched isotactic polypropylene and to their method of preparation.

A major interesting property of isotactic polypropylene is its high crystallinity, which makes it a solid material that can be used for specific applications. This property also presents some pitfalls like the fact that isotactic polypropylene is a brittle and poorly processable polymer. To overcome this problem, one can envision preparing so-called Long-Chain Branched Isotactic Polypropylene (LCB-iPP). The introduction of long branches in the polypropylene backbone gives the polymer some new mechanical properties; it becomes both stiff and stress resistant. Also, crystallinity decreases and, as a consequence, the polypropylene becomes much more processable.

To date, the only way to prepare LCB-PP, either isotactic or syndiotactic or atactic, is to copolymerise propylene and a longer α-olefin. In some cases, the comonomer is introduced in the polymerisation medium before injecting the copolymerisation catalyst.

The copolymerisation of propylene and methyloctadiene (MOD) has been achieved in an atactic fashion using Cp*TiMe$_3$/B(C$_6$F$_5$)$_3$ (Cp*=C$_5$Me$_5$) and in an isotactic fashion using a metallocene catalyst system comprising the metallocene component {rac-C$_2$H$_4$(Ind)$_2$}ZrCl$_2$ (Ind=1-indenyl) and methylaluminoxane (MAO) as activating agent. This method is described in Fuquan Song, Daniela Pappalardo, Anthony F. Johnson, Bernhard Rieger, and Manfred Bochmann, *J. Polym. Chem.: Part A: Polym. Chem.*, 2002, 40, 1484-1497. The comonomer incorporation was a linear function of the feed ratio.

The same trend was observed for the copolymerisation of propylene and other α-olefins (1-hexene and 1-octene) using either isospecific systems such as {rac-C$_2$H$_4$(Ind)$_2$}ZrCl$_2$, {rac-C$_2$H$_4$(2-MeInd)$_2$}ZrCl$_2$ or {rac-Me$_2$Si(Ind)$_2$}ZrCl$_2$ activated with MAO as syndiospecific systems such as {Ph$_2$C(Flu)(Cp)}ZrCl$_2$ (Flu=9-fluorenyl) and {Me2C(Flu)(Cp)}ZrCl$_2$ also activated with MAO. These methods are described in Raul Quijada, Juan Luis Guevara, Griselda B. Galland, Franco M. Rabagliati and Juan M. Lopez-Majada, Polymer, 2005, 1567-1574.

In some other cases the macromer was formed in situ with a first catalytic system before the copolymerisation catalyst was introduced in the reaction medium. The copolymerisation of propylene and ethylene-based macromers led to LCB-sPP as described in S. Rulhoff and W. Kaminsky, *Macromol. Symp.*, 2006, 236, 161-167. First, macromers were synthesised using the metallocene catalyst system {Me$_2$C(Cp)$_2$}ZrCl$_2$/MAO, and then the reactor was purged from ethylene gas, the second catalyst system {Ph$_2$C(Cp)(Flu)}ZrCl$_2$/MAO was injected and propylene was injected into the reaction medium to yield the copolymer.

It has been reported that in situ generation of atactic PP macromers by {[2-ArN=C(Me)]$_2$C$_5$H$_3$N}FeCl$_2$/MAO wherein Ar is 2,6-C$_6$H$_3$(Me)$_2$ could be followed by its copolymerisation with propylene by injection of the isospecific {rac-Me$_2$Si(2-MeBenz[e]Ind)$_2$}ZrCl$_2$/MAO catalyst system. Attempts to synthesise the copolymer in a one-step protocol, by injection of the two catalysts at the same time, has failed as described in Zhibin Ye and Shiping Zhu, *J. Polym. Chem.: Part A: Polym. Chem.*, 2003, 41, 1152-1159.

There are no examples of one-step synthesis of LCB-PP. A "one-step process" is advantageous as there is no need of comonomer feed or of previous in situ comonomer synthesis thereby greatly simplifying the process. Such process has however been used for the copolymerisation of ethylene to end up with so-called Long-Chain Branched Polyethylene (LCB-PE).

Several catalyst combinations were found to be effective for synthesising LCB-PE by tandem catalysis. A mixture of {C$_5$H$_5$B-OEt}$_2$ZrCl$_2$/MAO, used for oligomerising ethylene, and of [(η$^5$-C$_5$Me$_4$)SiMe$_2$(η$^1$-NCMe$_3$)]TiCl$_2$/MAO, used for copolymerising the macromers and ethylene, provided synthesis of LBC-PE with a quantitative incorporation of the macromer formed. The melting point of the polymer, reflecting the number of branches incorporated, was a function of the initial ratio of the two catalysts as described in Richard W. Barnhart and Guillermo C. Bazan, *J. Am. Chem. Soc.*, 1998, 120, 1082-1083.

Another tandem catalyst system that proved to be efficient was the combination of {[(2-ArN=C(Me))$_2$C$_5$H$_3$N]FeCl$_2$}/MAO wherein Ar is 2-C$_6$H$_4$(Et) and of {rac-Me$_2$Si(Ind)$_2$}ZrCl$_2$/MAO or {rac-C$_2$H$_4$(Ind)$_2$}ZrCl$_2$/MAO, respectively for macromer production and for copolymerisation as described in Raul Quijada, René Rojas, Guillermo Bazan, Zachary J. A. Komon, Raquel S. Mauler and Griselda B. Galland, *Macromolecules*, 2001, 34, 2411-2417.

The preparation of LBC-PE with two different lengths of branches has also been reported in Zachary J. A. Komon, Gary M. Diamond, Margarete K. Leclerc, Vince Murphy, Miho Okazaki and Guillermo C. Bazan, *J. Am. Chem. Soc.*, 2002, 124, 15280-15285. In this case, the system was based on a triple catalysis.

There is a need for single-step catalysis of long-chained branched isotactic polypropylene.

It is an aim of the present invention to provide an effective process for the synthesis of LCB-iPP by tandem catalysis.

It is another aim of the present invention to provide isotactic polypropylene with an homogeneous distribution of long branches.

It is also an aim of the present invention to provide isotactic propylene polymers having good processability.

Any one of those aims is, at least partially, fulfilled by the present invention.

Accordingly, the present invention discloses a process to prepare long chain branched isotactic polypropylene (LCB-iPP) that comprises the steps of:
a) oligomerising propylene with a first metallocene or post-metallocene catalyst system suitable for producing macromers having vinyl-terminated chains or providing "molecular" alpha-olefins;
b) copolymerising the macromers obtained in step a) with propylene using a metallocene catalyst system comprising a catalyst component of formula

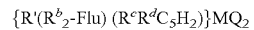

having C1 symmetry or C2 symmetry wherein R' is a mono-aryl-substituted methylene bridge, preferably a mono-phenyl-substituted methylene bridge, and wherein R$^b$, R$^c$ and R$^d$ are each independently selected from H or alkyl having from 1 to 12 carbon atoms, or aryl groups having up to 12 atoms, or silyl groups substituted or unsubstituted wherein M is a metal Group 4 of the Periodic Table and wherein Q is halogen or alkyl having from 1 to 12 carbon atoms and an activating agent having an alkylating and ionising action;

c) retrieving a long-chain-branched isotactic polypropylene (LCB-iPP)

Preferably, the copoymerisation catalyst component has C1 symmetry.

In a preferred embodiment according to the present invention, the fluorenyl group is substituted in positions 3 and 6 with a bulky substituent. The preferred subsituent is tert-butyl.

Preferably the cyclopentadienyl group is substituted in a position distal to the bridge with a bulky substituent, at least as bulky as tert-butyl, and in a position vicinal to the bridge but not vicinal to the distal susbstituent with a small substituent, smaller than tert-butyl. The bulky substituent may be selected from tert-butyl, ethyl or phenyl and the small substituent is preferably methyl.

The oligomerisation catalyst system is not particularly limited as long as it produces vinyl-terminated chains. Amongst the preferred catalyst components, one can cite $Cp*_2MQ_2$ wherein $Cp*$ is a cyclopentadienyl substituted with 5 alkyl groups, preferably with 5 methyl groups, and wherein M is a metal group 4 of the Periodic Table, preferably Zr or Hf and Q is halogen or alkyl, preferably Cl. Other preferred oligomerisation catalyst components can be selected from $\{R'(2-R''_3Si\text{-}Ind)_2\}MQ_2$ wherein R' is a one- or two-atom (C, Si) bridge between the two indenyl moieties and R" is alkyl having from 1 to 6 carbon atoms, preferably methyl, or from iron complex of formula $\{2,6\text{-}(ArN=C(Me))_2Pyr\}FeCl_2$, wherein Ar is $2,6\text{-}Me_2C_6H_3$ and Pyr is pyridine (see below):

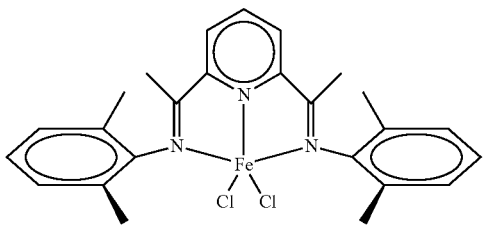

The oligomerisation catalyst system further comprises an activating agent based on aluminium or boron. The most preferred activating agent is methylaluminoxane (MAO).

The preferred copolymerisation catalyst component can be selected from $\{CHPh\ (3,6\text{-}tBu_2\text{-}Flu)\ (3\text{-}tBu,5\text{-}MeC_5H_2)\}ZrCl_2$, $\{CHPh\ (3,6\text{-}tBu_2\text{-}Flu)\ (3\text{-}tBu,5\text{-}EtC_5H_2)\}ZrCl_2$ or $\{CHPh\ (3,6\text{-}tBu_2\text{-}Flu)\ (3\text{-}tBu,5\text{-}PhC_5H_2)\}ZrCl_2$, the most preferred being $\{CHPh\ (3,6\text{-}tBu_2\text{-}Flu)\}(3\text{-}tBu,5\text{-}EtC_5H_2)ZrCl_2$.

The copolymerisation catalyst component must also be activated with an activating agent, preferably the same as that used with the oligomerisation catalyst component, more preferably MAO.

The relative amounts of first and second catalyst components is not particularly limited and must be adjusted according to the number of branches sought, the nature of the oligomerisation and copolymerisation catalyst components and the desired composition of the final polymer. The ratio of the copolymerisation to oligomerisation catalyst components can range from 1:1 to 100:1.

In a first step, the oligomerisation of propylene with the $Cp*_2ZrCl_2/MAO$ ($Cp*=C_5Me_5$) system was investigated and the obtained oligomers were studied in order to determine their vinyl-end content and chains length.

Then the ability of the $\{(3\text{-}tBu\text{-}5\text{-}MeCp)CHPh(3,6\text{-}tBu_2Flu)\}ZrCl_2/MAO$ catalyst system to copolymerise propylene with "molecular" α-olefins was investigated.

Alternatively, instead of being polymerised in situ, the macromers can be prepared independently and added to the reactor. Such "molecular" α-olefins or macromers can be selected for example from 7-methyl-1,6-octadiene (MOD), 8-trimethylsilyl-1-octene (TMS-octene)).

Preferably, they are macromers issued from the oligomerisation of propylene for example with the $Cp*_2ZrCl_2/MAO$ system.

The oligomerisation and copolymerisation can be carried out sequentially with isolation of the macromer between the two steps. Alternatively and preferably, both oligomerisation and copolymerisation can be carried out in one step by inserting both catalyst components and the activating agent simultaneously in the same reactor.

All the polymerisations were performed at a temperature of from 20 to 150° C., preferably 50 to 100° C., under a pressure of from 1 to 30 bars, preferably from 3 to 15 bars and for a period of time of from 2 minutes to 2 hours, in a single reactor either in two successive steps of oligomerisation followed by copolymerisation or in a single step wherein both catalyst components were introduced simultaneously into the reactor.

EXAMPLES

All polymerisations were performed according to the following procedure: A 300 mL glass reactor was purged under vacuum and then filled with argon. The reactor was charged under argon with 150 mL of dry toluene, an appropriate amount of MAO and the comonomer, when not generated in situ. The reactor was pressurised at 5 atm with propylene and thermostated to a temperature of about 60° C. via circulation of water in the double mantle. When the reactor had reached the required temperature, propylene was vented, the metallocene pre-catalyst was injected in by syringe and the reactor was pressurised at 5 bars with propylene. After the desired reaction time period, the reactor was depressurised and the polymerisation was quenched by addition of a protic compound. For the oligomerisation process, the solvent was removed and the residue was dried under vacuum. For the copolymerisation process, methanol was added and the polymer that precipitated was filtered, washed with methanol and dried under vacuum.

Examples 1 and 2

Oligomerization of Propylene $Cp*_2ZrCl_2/MAO$ System.

First, the oligomerisation described in Janiak et al. (Christoph Janiak, Katharina C. H. Lange and Peter Marquardt, in *J. Mol. Catal A: Chem.*, 2002, 180, 43-58) (Scheme 1). The catalyst used was $Cp*_2ZrCl_2$ with 1000 equivalents of MAO vs Zr, and 10 min of pre-activation. 150 mL of toluene were used as solvent. The amount of oligomers obtained in 1 h was the same as that described in the latter article. Oligomers were analysed by $^1H$ NMR and proved to be 90% vinyl-ended. They had a number average molecular weight Mn of 280 g.mol$^{-1}$. Slightly different conditions were also tested in example 2, resulting in similar oligomers (Mn=320 g.mol$^{-1}$, 90% vinyl-ended). In both cases, the remaining 10% are vinylidene-ended oligomers. Thanks to the 90% of vinyl-ends, these oligomers were used for further copolymerisations. The oligomerisation results are displayed in Table 1.

Scheme 1

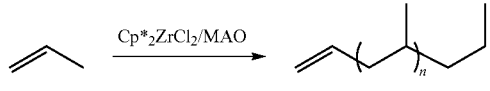

TABLE 1

| Example | [Zr] (μmol·L$^{-1}$) | [Al]/[Zr] | T (°C.) | t (min) | activity (Kg·mol$^{-1}$·h$^{-1}$) | $M_n$ (g·mol$^{-1}$) | vinyl-ends (%) |
|---|---|---|---|---|---|---|---|
| 1 | 70 | 1000 | 50 | 60 | 1070 | 280 | 90 |
| 2 | 35 | 1500 | 60 | 30 | 400 | 320 | 90 |

Examples 3-8

Copolymerization of Propylene and Preliminarily-prepared Comonomers by the {(3-tBu-5-MeCp)CHPh(3,6-tBu$_2$Flu)}ZrCl$_2$/MAO system.

The metallocene catalyst system {(3-tBu-5-MeCp)CHPh(3,6-tBu$_2$Flu)}ZrCl$_2$/MAO was used to copolymerise propylene and higher α-olefins (Scheme 2). Three different comonomers were used for this purpose: 8-trimethylsilyl-1-octene (TMS-octene), 7-methyl-1,6-octadiene (MOD) and propylene oligomers previously obtained with the Cp*$_2$ZrCl$_2$/MAO system in example 1.

Copolymers from propylene and each of these macromers were synthesised. As a reference test, homopolymerisation of propylene (example 3) was carried out under the same conditions of temperature, propylene pressure, [Zr], [Al]/[Zr], ... as those used for copolymerisations. Copolymers formed with TMS-octene (examples 4 and 5) and MOD (examples 6 and 7) were analysed by $^1$H NMR in C$_2$D$_2$Cl$_4$ at a temperature of 373 K to determine the comonomer incorporation amount, by integration of characteristic signals CH=CMe$_2$ and Si(CH$_3$)$_3$. Example 8 was obtained with the oligomers obtained in example 1. The melting temperatures were determined by DSC measurements and the molecular weights and molecular weight distributions were determined by GPC (at room temperature, in THF, vs polystyrene standards). Some of the samples were also analysed by dynamic rheology. The results are reported in Table 2.

TABLE 2

| Example | comonomer (nature) | comonomer (mg) | t (min) | activity (Kg·mol$^{-1}$·h$^{-1}$) | $T_m$ (°C.) | $M_w$ (×10$^3$ g·mol$^{-1}$) | PDI |
|---|---|---|---|---|---|---|---|
| 3 | — | — | 30 | 5940 | 156 | 200 | 2.6 |
| 4 | TMS-octene | 265 | 10 | 8035 | 149 | 187 | n.d. |
| 5 | TMS-octene | 505 | 10 | 21695 | 146 | n.d. | n.d. |
| 6 | MOD | 280 | 10 | 2325 | 146 | n.d. | n.d. |
| 7 | MOD | 510 | 10 | 7635 | 145 | n.d. | n.d. |
| 8 | OligoPP | 400 | 10 | 20830 | 151 | n.d. | n.d. |

The polymerization conditions were as follows:
toluene (150 mL),
[Zr] = 10 μmol·L$^{-1}$, MAO (5000 equiv. vs Zr), in situ activation,
P(propylene) = 5 bars,
T = 60° C.

As evidenced by the lower $T_m$ values, the obtained copolymers were less crystalline than the isotactic homopolypropylene obtained with no comonomer. Interestingly and unexpectedly, an improvement of the catalytic activity, as a direct function of the comonomer feed, was observed.

Examples 9-15

Long-chain Branching Polymerization by Tandem Catalysis.

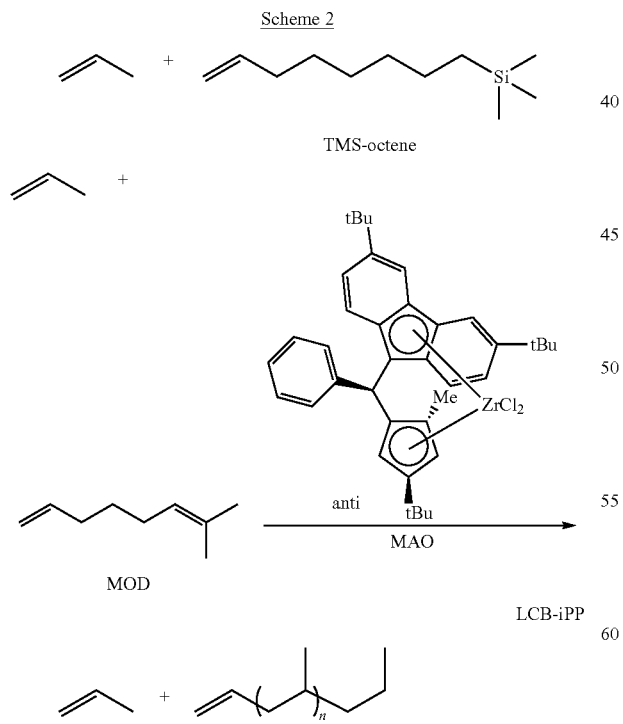

Scheme 2

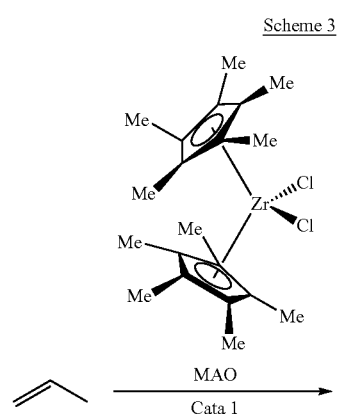

Scheme 3

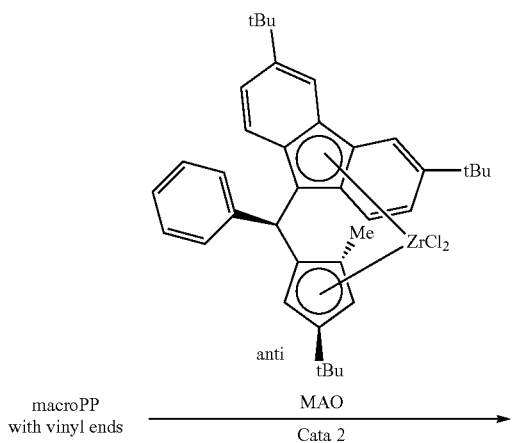

macroPP with vinyl ends —MAO, Cata 2→

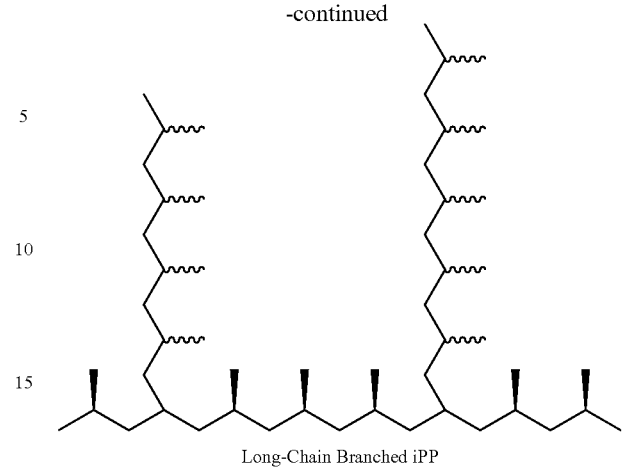

Long-Chain Branched iPP

For the one-pot synthesis of LCB-iPP represented in Scheme 3, two different protocols were used. The first protocol consists in a sequential polymerisation, in which the Cp*$_2$ZrCl$_2$/MAO system, pre-activated for 10 min, was reacted with propylene for a 30 minutes time period to produce vinyl end-capped propylene oligomers, after which time period {(3-tBu-5-MeCp)CHPh(3,6-tBu$_2$Flu)}ZrCl$_2$ was further injected in the reactor and the reaction was pursued for a 30 minutes time period in order to achieve copolymerisation. Results for examples 9 and 10 are reported in Table 3.

TABLE 3[a]

| example | [Zr$_1$] (μmol·L$^{-1}$) | [Zr$_2$] (μmol·L$^{-1}$) | [Al]/[Zr$_1$] | [Al]/[Zr$_2$] | activity[b] (Kg·mol$^{-1}$·h$^{-1}$) | M$_w$ (×10$^3$ g·mol$^{-1}$) | PDI |
|---|---|---|---|---|---|---|---|
| 9 | 35 | 10 | 1500 | 5000 | 0[c] | 0.296[c] | n.d. |
| 10 | 35 | 100 | 1500 | 500 | 181[d] | 126 (66 wt-%) 1.3 (34 wt-%) | 1.46/ 1.08 |

[a]The polymerisation conditions were as follows: [Zr$_1$] = Cp*$_2$ZrCl$_2$, [Zr$_2$] = {(3-tBu-5-MeCp)CHPh(3,6-tBu$_2$Flu)}ZrCl$_2$; Polymerization conditions: toluene (150 mL), P(propylene) = 5 bars, T = 60° C.,
[b]activity calculated vs [Zr$_2$]
[c]only oligomers were obtained in this run; their molecular weight was determined by $^1$HNMR.
[d]The final product obtained in this run was an oily product, which showed two very distinct and separated distributions in GPC. No melting point was measured.

The second protocol used was a direct (co)polymerization by tandem catalysis, with introduction of the two catalysts components at the same time. The reaction time was of 30 min. The results for examples 11 to 13 are reported in Table 4.

TABLE 4[a]

| example | [Zr$_1$] (μmol·L$^{-1}$) | [Zr$_2$] (μmol·L$^{-1}$) | [Al]/[Zr$_1$] | [Al]/[Zr$_2$] | activity[b] (Kg·mol$^{-1}$·h$^{-1}$) | T$_m$ (° C.) | M$_w$ (×10$^3$ g·mol$^{-1}$) | PDI |
|---|---|---|---|---|---|---|---|---|
| 11 | 35 | 10 | 1500 | 5000 | 105 | 101 | n.d. | n.d. |
| 12 | 17 | 50 | 3000 | 1000 | 195 | 129 | 77 | 2.3 |
| 13 | 6 | 50 | 8000 | 1000 | 285 | 131 | n.d. | n.d. |

[a]The polymerisation conditions were as follows: [Zr$_1$] = Cp*$_2$ZrCl$_2$ and [Zr$_2$] = {(3-tBu-5-MeCp)CHPh(3,6-ditBuFlu)}ZrCl$_2$; toluene (150 mL), P(propylene) = 5 bars, 60° C.
[b]activity calculated vs [Zr$_2$]

From these results, it appears that the copolymerisation activity of the {(3-tBu-5-MeCp)CHPh(3,6-tBu₂Flu)}ZrCl₂/MAO catalyst system was diminished, as compared to its activity observed for homopolymerisation of propylene or its copolymerization with higher α-olefins preliminarily prepared (see Table 2).

Finally, the use of the {(3-tBu-5-EtCp)CHPh(3,6-tBu₂Flu)}ZrCl₂/MAO system was evaluated for the tandem catalysis. The results for example 14 are given in Table 5.

TABLE 5[a]

| example | [Zr₁] (µmol·L⁻¹) | [Zr₂] (µmol·L⁻¹) | [Al]/[Zr₁] | [[Al]/[Zr₂] | Activity[b] (Kg·mol⁻¹·h⁻¹) | $T_m$ (°C.) | $M_w$ (×10³ g·mol⁻¹) | PDI |
|---|---|---|---|---|---|---|---|---|
| 14 | 12 | 40 | 4000 | 1300 | 250 | n.d. | n.d. | n.d. |

[a]The polymerisation conditions were as follows: [Zr₁] = Cp*₂ZrCl₂ and [Zr₂] = {(3-tBu-5-EtCp)CHPh(3,6-tBu₂Flu)}ZrCl₂; toluene (150 mL), P(propylene) = 5 bars, T = 60° C.
[b]activity calculated vs [Zr₂]

The activity of the {(3-tBu-5-EtCp)CHPh(3,6-tBu₂Flu)}ZrCl₂/MAO catalyst system was slightly higher than that of the {(3-tBu-5-MeCp)CHPh(3,6-tBu₂Flu)]ZrCl₂/MAO system for this tandem catalysis application.

The invention claimed is:

1. A method for preparing long-chain-branched isotactic polypropylene that comprises the steps of:
   a) feeding propylene into a reactor;
   b) providing an oligomerisation catalyst system capable of producing macromers of propylene having vinyl-terminated chains;
   c) providing a metallocene catalyst system to copolymerise the macromers of step b) with propylene wherein said metallocene catalyst system comprises a catalyst component of formula

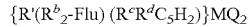
   {R'(R$^b$₂-Flu) (R$^c$R$^d$C₅H₂)}MQ₂ having C1-symmetry or C2-symmetry wherein R' is a mono-aryl-substituted methylene bridge, and wherein R$^b$, R$^c$ and R$^d$ are each independently selected from H or alkyl having from 1 to 12 carbon atoms, or aryl groups having up to 12 carbon atoms, or silyl groups substituted or unsubstituted wherein M is a metal Group 4 of the Periodic Table and wherein Q is halogen or alkyl having from 1 to 12 carbon atoms
   and an activating agent having an alkylating and ionising action, wherein the oligomerisation and copolymerisation are carried out in one step by inserting both catalyst components and the activating agent simultaneously in the reactor;
   d) retrieving polypropylene product.

2. The method of claim 1 wherein the oligomerisation catalyst system is selected from Cp*₂MQ₂ or R'(2-R"₃Si-Ind)₂MQ₂ or iron complex of formula {2,6-(ArN=C(Me))₂Pyr}FeCl₂, wherein Cp* is cyclopentadienyl substituted with 5 alkyl groups, M is a metal group 4 of the periodic table, Q is halogen or alkyl having at most 6 carbon atoms, R' is a one- or two-atom (C, Si) bridge linking the two indenyl moieties, R" is alkyl having from 1 to 6 carbon atoms, Ind is 1-indenyl group, Ar is 2,6-Me₂C₆H₃ and Pyr is pyridine.

3. The method of claim 2 wherein the oligomerisation catalyst is selected from Cp*₂ZrCl₂ or Cp*HfC₂ or rac-C₂H₄(2-Me"₃Si-Ind)₂ZrCl₂.

4. The method of claim 1 wherein the copolymerisation catalyst component has C1-symmetry;
   wherein substituent R$^c$ is at least as bulky as tert-butyl and at a position distal to the bridge; and wherein R$^d$ is at a position vicinal to the bridge, non vicinal to R$^c$ and is less bulky than tert-butyl.

5. The method of claim 4 wherein the copolymerisation catalyst component is selected from {CHPh(3,6-tBu₂Flu)(3-tBu,5-MeC₅H₂)}ZrCl₂, {CHPh(3,6-tBu₂Flu)(3-tBu,5-EtC₅H₂)}ZrCl₂ or {CHPh(3,6-tBu₂Flu)(3-tBu,5-PhC₅H₂)}ZrCl₂.

6. The method of claim 1 wherein the activating agent is the same for both catalyst components and is methylaluminoxane.

7. The method of claim 1 wherein the ratio of copolymerisation to oligomerisation catalyst components is from 1:1 to 100:1.

8. The method of claim 1, wherein R' is a mono-phenyl-substituted methylene bridge.

9. The method of claim 4, wherein the copolymerisation catalyst component is {CHPh (3,6-tBu₂Flu)(3-tBu,5-EtC₅H₂)}ZrCl₂.

* * * * *